United States Patent [19]
Tsao

[11] Patent Number: 5,529,385
[45] Date of Patent: Jun. 25, 1996

[54] DISMOUNTING DEVICE FOR GOLF CART WHEEL

[76] Inventor: Chang-Feng Tsao, 3 Floor-1, No. 65, Section 3, Rooosevelt Rood, Taipei, Taiwan

[21] Appl. No.: 320,336

[22] Filed: Oct. 11, 1994

[51] Int. Cl.⁶ ........................................... B60B 37/00
[52] U.S. Cl. ............................. 301/111; 301/121; 403/321
[58] Field of Search ................................ 301/105.1, 111, 301/112, 118, 119, 120, 121, 124.1, 126, 131; 403/315, 316, 319, 321, 322, 324, 325; 280/642, 645, 646, 647, 652, 654, DIG. 4, DIG. 6

[56] References Cited

U.S. PATENT DOCUMENTS 5,172,998  12/1992  Hatagishi ........................... 403/322 X

FOREIGN PATENT DOCUMENTS 144985    1/1920   United Kingdom .................. 301/121
1049790  11/1966   United Kingdom .................. 301/121

Primary Examiner—Russell D. Stormer

[57] ABSTRACT

This invention relates to a dismounting device for golf cart wheel, being composed of a wheel shaft and a connector, the front of the wheel shaft having an inserting part, the inserting part being composed of a circular guide part and a square locating part, on the circumference of the circular guide part having a groove; the connector having a fitting hole formed at its one side, the fitting hole being composed of a circular hole and a square groove, the inserting part of wheel shaft can be inserted quickly into the fitting hole of the connector by the circular guide part. An upper cover being hinged on the connector and can be rotated to open or close, at the bottom of the upper cover having a stop plate which exenden to the groove of the circular guide part to retain the wheel shaft.

1 Claim, 4 Drawing Sheets

DISMOUNTING DEVICE FOR GOLF CART WHEEL

BACKGROUND OF THE INVENTION

This invention relates to a dismounting device for golf cart wheel, which being composed of a wheel shaft and a connector, the wheel shaft having an inserting part which can be inserted into the fitting hole of the connector, furthermore the connector having an upper cover under which having a stop plate, the stop plate can be inserted into the groove of the wheel shaft so as to fix the wheel shaft therefore the wheel shaft can be connected with or aparted from the connector quickly by means of closing or opening the upper cover of the connector.

The conventional golf cart usually be trailed on the uneven golf ground, the wheels of golf cart must be dismounted frequently to clean, but the wheels of the conventional golf cart being fixed by screw or other complicate devices, it having the following defects: (1) The wheels of conventional golf cart are fixed by screws, it spending more time for user to dismount these wheels from the conventional golf cart. (2) As to the wheels of conventional golf cart being fixed by other complicate devices, because such kind of complicate device is composed of many elements, it having more manufacturing cost.

SUMMARY OF THE INVENTION

It is therefore the main object of this invention to provide a dismounting device for golf cart wheel, which being composed of a wheel shaft and a connector, the wheel shaft having an upper cover under which having a stop plate, the stop plate can be inserted into the groove of the wheel shaft so as to fix the wheel shaft, therefore the wheel shaft can be connected with or aparted from the connector quickly by means of closing or opening the upper cover of the connector.

It is another object of this invention to provide a dismounting device for golf cart wheel, which being composed of a wheel shaft and a connector, the wheel shaft having an inserting part which is composed of a circular guide part and a square locating part, the circular guide part can guide the inserting part into the fitting hole quickly, the square locating part can be fitted with the square groove in the fitting hole so as to prevent the wheel shaft from being rotated.

It is still another object of this invention to provide a dismounting device for golf cart wheel, which having a brief structure and elements, the dismounting device for golf cart wheel having lower manufacturing cost than the conventional dismounting device for golf cart wheel.

BRIEF DESCRIPTION OF THE DRAWINGS

In the drawings, which illustrate the preferred embodiments and modes of operation of the invention, and in which like reference characters designate the same or similar parts throughout the several views.

DETAILED DESCRIPTION OF THE PREFERRED EMBODIMENT

Figure 1:
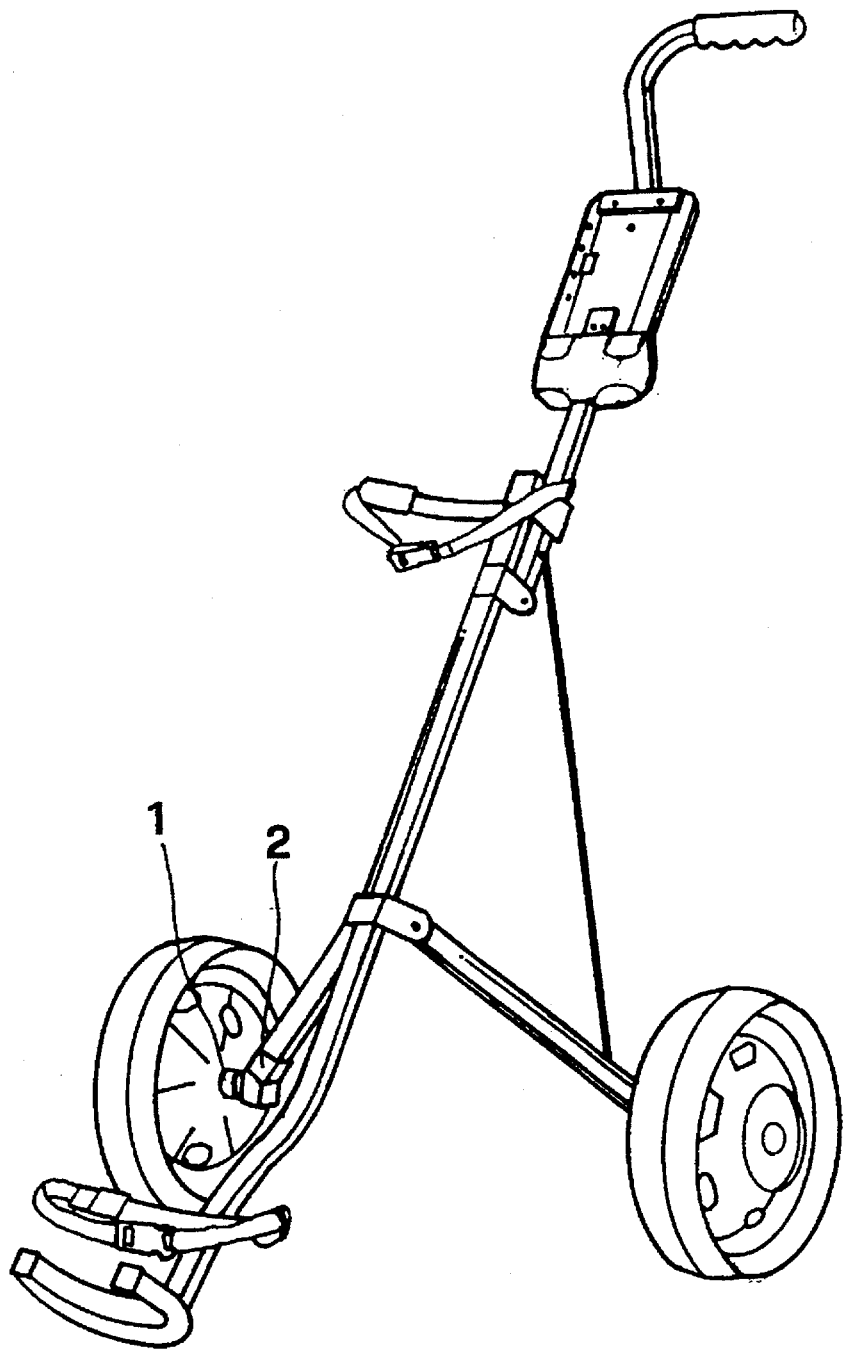
FIG. 1 is a perspective view showing the position of the dismounting device for golf cart wheel of this invention.
Figure 2:
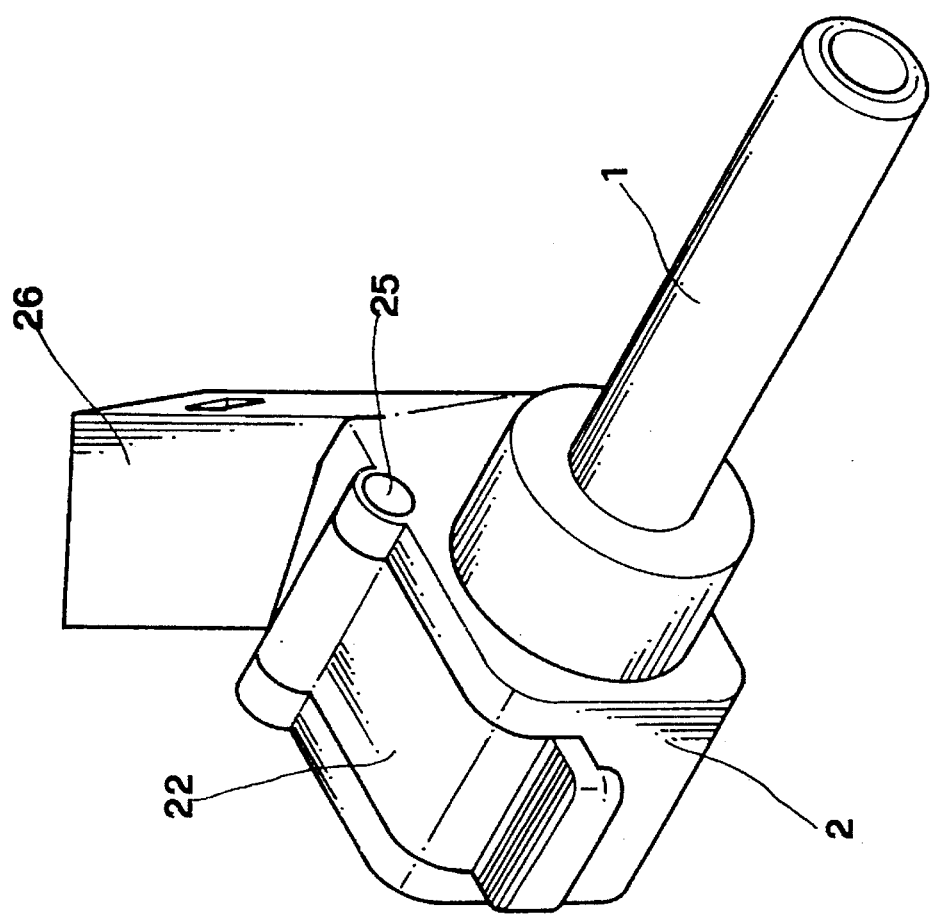
FIG. 2 is a perspective view of this invention.
Figure 3:
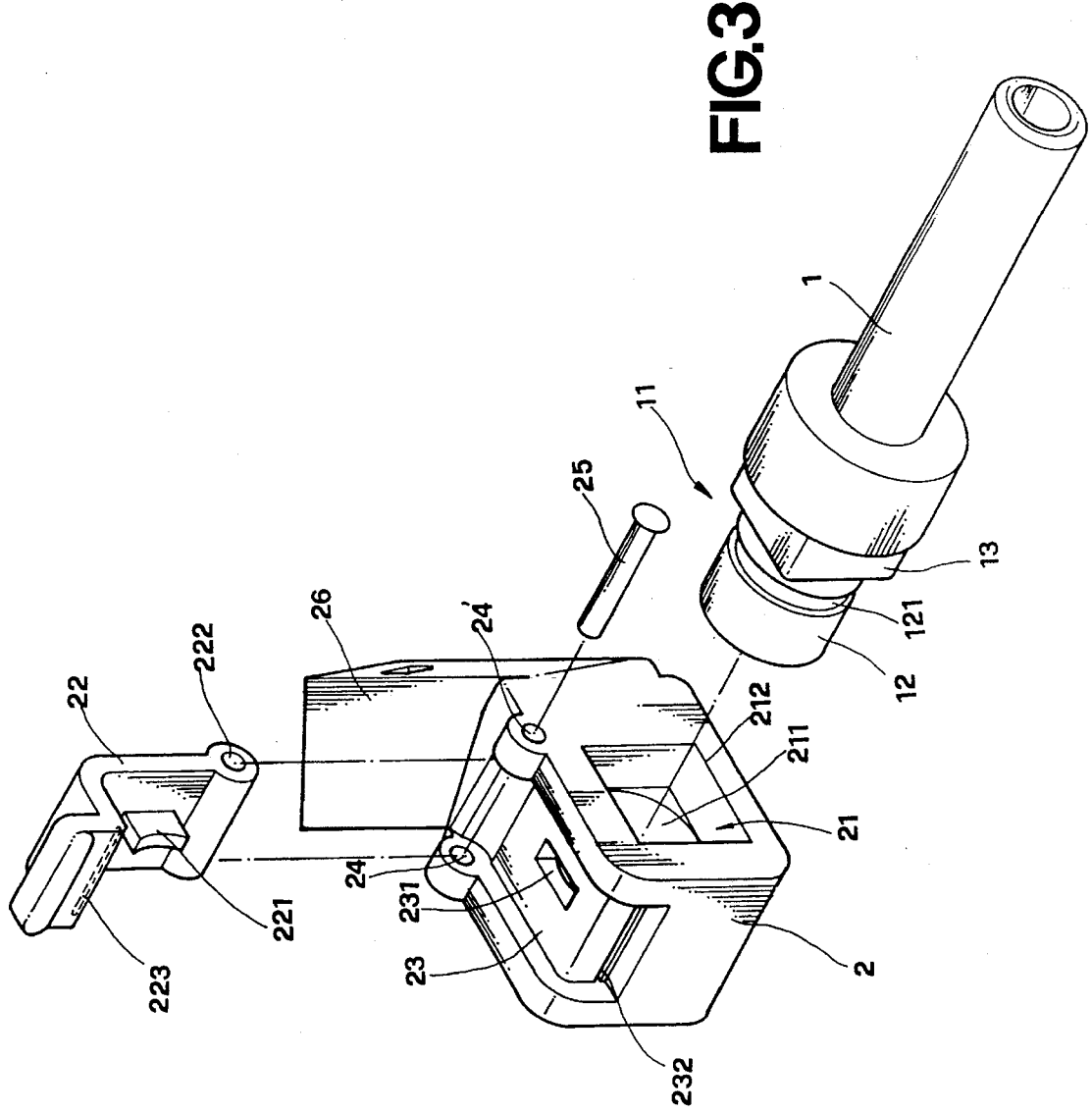
FIG. 3 is an exploded view of this invention.

Referring to FIG. 1, FIG. 2 and FIG. 3, the present invention, a dismounting device for golf cart wheel, is composed of a wheel shaft (1) and a connector (2), wherein the wheel shaft (1) having an inserting part (11) formed at its front, the other end of the wheel shaft (1) being connected with the golf cart wheel, the inserting part (11) comprising a circular guide part (12) and a square locating part (13), on the circumference of the circular guide part (12) having a groove (121). The connector (2) have a fitting hole (21) formed at its one, side, the fitting hole (21) comprising a circular hole (211) and a square groove (212), furthermore an upper cover (22) can be hinged on the top of the connector (2) by inserting a pin (25) into the fixing holes (24) (24') of the connector (2) and the connecting hole (222) of the upper cover (22) so as to make the upper cover (22) can be rotated freely to open or close around the pin (25), on the bottom of the upper cover (22) having a stop plate (221), the upper cover (22) being fitted with the receiving groove (23) of the connector (2) when it being closed, on the receiving groove (23) having a through aperture (231) which lead to the circular hole (211) of the fitting hole (21), furthermore the stop plate (221) of the upper cover (22) can be inserted through the through aperture (231) and into the groove (121) of the circular guide part (12). In addition, the connector (2) have a connecting tube (26) which can be fitted with supporting rod of golf cart.

Figure 4:
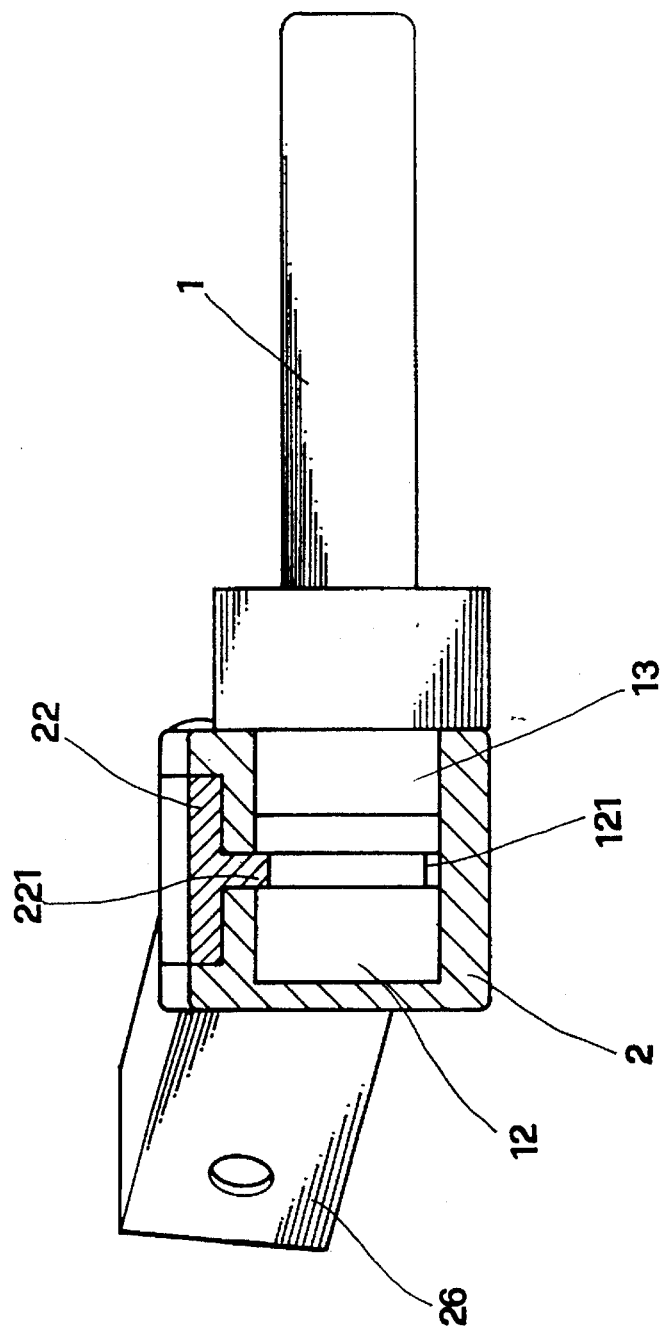
FIG. 4 is a partial sectional view of this invention.

Referring to FIG. 4, the inserting part (11) of the wheel shaft (1) can be inserted into the fitting hole (21) of the connector (2), the circular guide part (12) can guide the inserting part (11) into the circular hole (211) of the fitting hole (21) quickly; the square locating part (13) being fitted with the square groove (212) of the fitting hole (21) so as to prevent the wheel shaft (1) from being rotated, therefore the other end of the wheel shaft(1) can be installed with bearings. The upper cover (22) can be closed after the wheel shaft (1) being inserted into the fitting hole (21) of the connector (2), thus the stop plate (221) under the upper cover (22) can go through the through aperture (231) and inserted into the groove (121) of circular guide part (12) so to fix the wheel shaft (1), furthermore the end of the upper cover (22) having a flange (223) which can be pushed into a fitting flute (232) formed at the end of the receiving groove (23) so as to prevent the stop plate (221) from aparting from the groove (121) on trailing way. The wheel shaft (1) can be dismounted from the connector (2) quickly by opening the upper cover (22) to make the stop plate (221) aparted from the groove (121), therefore the golf cart wheel can be dismounted quickly to clean.

It is understood by those skilled in the art that the foregoing description is a preferred embodiment of the disclosed device and that various changes and modifications may be made in the invention without departing from the spirit and scope thereof.

What is claimed is

1. A dismounting device for a golf cart wheel comprising:

a wheel shaft having an inserting part, said inserting part comprising a circular guide part, and a square locating part, said circular guide part defining an annular groove about its circumference;

a connector having a fitting hole, said fitting hole comprising a circular hole and a square groove, the connector having a receiving groove including an aperture formed through the connector and joining the circular hole, the receiving groove further having a fitting flute, said through aperture being perpendicular to said circular hole;

an upper cover which is hingedly joined to said connector to be pivotable, a stop plate disposed on one side of the upper cover, and a flange;

said inserting part of said wheel shaft being received into said fitting hole of said connector and being guided by said circular guide part into said circular hole, said square locating part being fitted into said square groove to prevent rotation of said wheel shaft, said wheel shaft being locked in said connector upon pivoting said upper cover such that said stop plate projects through said aperture of said receiving groove and is received in said groove of said circular guide part;

the flange of said upper cover extending into said fitting flute of said connector to prevent said stop plate from separating from said groove;

said wheel shaft being removable from said connector by opening said upper cover to remove said stop plate from said groove.

* * * * *